Patented Nov. 26, 1935

2,022,494

UNITED STATES PATENT OFFICE 2,022,494

PROCESS OF PREPARING MONO AND DI-GLYCERIDES

Carl W. Christensen, Chicago, Ill., assignor to Armour and Company, Chicago, Ill., a corporation of Illinois No Drawing. Application February 14, 1935, Serial No. 6,591

13 Claims. (Cl. 87—12)

This invention relates to processes of preparing mono and diglycerides and it comprises processes wherein higher fatty acids are esterified in the presence of a catalyst of the group consisting of alkali-forming metal soaps of higher fatty acids and alkali-forming metal glycerates; it further comprises processes of incorporating mono and diglycerides in various fatty or oily materials such as vegetable oils, edible shortening materials, mineral oils and the like, wherein a higher fatty acid is esterified with glycerine in the presence of such fatty or oily material and in the presence of the above stated catalysts so that the resulting glyceride is formed in situ in the fatty or oily material.

Mono and diglycerides of higher fatty acids are becoming of increasing technical and practical interest because of their pronounced emulsifying power. These materials all possess the following type formulæ:

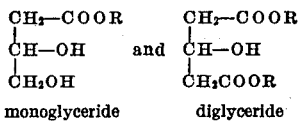

| monoglyceride | diglyceride | wherein R is a relatively long hydrocarbon and COOR is a higher fatty acid radical. Whereas an ordinary vegetable or animal fat is a triglyceride, that is, there are no free hydroxyl groups in the glycerine molecule, the mono and diglycerides always contain at least one such free hydroxyl group and it is likely that their marked emulsifying power is due, at least in part, to this molecular structure.

Within recent years it has been suggested to add a small amount of the mono and diglycerides to many different materials. For instance, the use of these glycerides in mineral oils has been patented. In this relation they confer beneficial properties on the resulting oil compound. For some time it has been known that edible oils such as shortening oils and fats can be improved by incorporating small amounts of these glycerides therein. Thus the melting point of the edible fat can be raised, and it can be made to emulsify more readily with water as in the manufacture of margarine. In still other instances, use of these particular glycerides in cosmetics, polishes, oily emulsions etc. has been suggested.

Curiously enough, while the triglycerides are the common major constituents in most all animal and vegetable fats, the mono and diglycerides do not exist in nature. Because of the fact that until quite recently they were largely laboratory curiosities, relatively few methods for preparing them have been described. The classical method is that of reacting a glyceryl chlorhydrin with a fatty acid; another is that of reacting glycerine with definite predetermined quantities of free fatty acid, there being just enough present to react with one or two of the hydroxyls of the glycerine. Neither of these methods have been satisfactory. They are difficult to control, relatively high temperatures are required, and yield has left much to be desired. Of late it has been discovered that glycerine can be made to react with a triglyceride whereby mono and diglycerides can be formed. This reaction, when catalyzed by certain catalysts, is of practical, commercial importance.

Although, as stated, attempts have been made to react glycerine with definite predetermined quantities of free fatty acid, the amount of acid being regulated to give either mono or diglycerides, this method has not been satisfactory because the reaction must be catalyzed. Hitherto the catalysts selected have invariably been acid reacting substances. While hydrochloric acid is, of course, a well known esterification catalyst for most esterifying reactions, it has never been particularly satisfactory in making mono and diglycerides. Generally, these acid catalysts seem to work best in the esterification of monohydric alcohols. The prior art has also proposed the use of Twitchell's reagent for catalyzing the reaction between glycerine and fatty acids, but here again no satisfactory commercial results have been obtained.

I have now discovered a method of preparing the mono and diglycerides which does use as starting substances glycerine and higher fatty acids. I have discovered that by changing the type of catalyst hitherto used I can obtain markedly superior results and avoid contamination of reaction products by undesirable by-products. This feature is of extreme importance when making mono and diglycerides because the major use for these materials is in the manufacture of edible products. Any process that requires considerable purification of the reaction product is not commercially feasible. I have discovered that the alkali-forming metal glycerates and the alkali-forming metal soaps are extremely good catalysts for the reaction between glycerine and higher fatty acids. I wish to distinguish at this time the process of the present invention from those processes which prepare mono and diglycerides by reacting glycerine with triglycerides. In the former instance, the reaction is a straight forward esterification of one or two of the hydroxyl groups of the glycerine. In the second case, the reaction takes an entirely different course. In it one or two of the higher fatty acid radicals of a triglyceride are removed therefrom. In a sense this is the reverse of esterification. In the present invention, as stated, I am directly reacting glycerine with a higher fatty acid and it is indeed surprising that alkali-reacting catalysts such as soaps and metal glycerates are good catalysts. It has hitherto always been considered that acid reacting catalysts must be used.

In its broadest aspects then my invention relates to reactions of the following type:

leading to the formation of a monoglyceride and

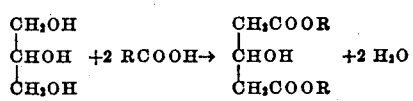

giving diglycerides. In both instances RCOOH is a higher fatty acid. And in both reactions I use as catalysts alkali-forming metal glycerates or alkali-forming metal soaps or mixtures thereof.

Any of the higher fatty acids can be used in my process. By higher fatty acid I mean those fatty acids having six or more carbon atoms beginning with caproic. Thus, in the saturated series of fatty acids I can use caporic, caprylic, capric, lauric, myristic, palmitic, stearic, arachidic, behenic, carnaubic, cerotic, and melissic. These fatty acids are generally obtained from animal and vegetable sources in the well known ways. Caproic for instance is obtained from butter fat, others from cocoanut oil, stearic from tallow, and melissic from beeswax. I can use fatty acids of the oleic series of which oleic acid is the most important member, others being tiglic, physetoleic, rapic and erucic. The fatty acids of the linolic series are also suitable, the major one being linoleic and others being tariric and elæomargaric.

As catalysts I can use any of the glycerates of the alkali or alkaline earth metals. Sodium glycerate has the greatest catalytic activity and it can be made in various ways. One of the easiest is to dissolve metallic sodium in glycerine to give either the mono or disodium derivative. Glycerine will also react with caustic soda, NaOH, to yield both the mono and di derivatives. The tri compound is unknown so far as I am aware, but there is no reason for supposing that it cannot be used. Potassium glycerates can be prepared in similar ways but the sodium compounds are considerably less expensive. Calcium glycerate can also be used and can be prepared in well known ways.

Of the soaps I find that sodium stearate is the cheapest and works the best although I can use other soaps of the alkali metals and also soaps such as calcium stearate. These soaps may be made from any of the higher fatty acids mentioned above and having six or more carbon atoms.

I shall now describe my invention with particular reference to the preparation of mono and distearin, it being understood, however, that I am not restricting myself thereto and that instead of starting with stearic acid I can start with any of the higher fatty acids noted above, or mixtures thereof.

For the preparation of monostearin I advantageously proceed as follows. I first dissolve with heating about two parts by weight of sodium hydroxide in 120 parts by weight of glycerine. In this way a small amount of sodium glycerate is formed in situ in a large volume of glycerine. This is a most convenient way of beginning but I can, of course, separately prepare substantially pure sodium glycerate and add it to my reaction mixtures. To the glycerine solution of sodium glycerate, heated to a temperature of about 150° C., I then add about three hundred parts by weight of triple pressed commercial stearic acid. During the addition of the stearic acid the mixture is advantageously stirred and I then increase the temperature to about 200° to 220° C. maintaining the heating for about an hour. At the end of this time the reaction mixture is permitted to cool. It sets to an amorphous wax-like solid and on analysis shows a free fatty acid content of about 3.4%. This indicates that the reaction has proceeded to such an extent that the yield is about 96-97% of the theoretical for monostearin.

In a similar manner I can prepare distearin by simply doubling the quantities of stearic acid used. Mixtures of mono and distearin can also be prepared by regulating the quantity of higher fatty acid reacted with the glycerine.

The above example refers specifically to the use of sodium glycerate as a catalyst. I shall now describe a further example wherein sodium stearate (soap) is used as a catalyst. In this example three hundred parts by weight of stearic acid are melted and then, with stirring, 120 parts by weight of glycerine containing 10 parts by weight of sodium stearate are added. The reaction mixture is heated to a temperature of about 200° to 220° C. over a period of an hour and then allowed to cool. Analysis of the reaction products shows that the yield of monostearin is about 93% of the theoretical. In a similar manner, by doubling the quantity of stearic acid a product consisting mostly of distearin can be obtained and various mixtures of mono and distearin can be prepared by varying the quantity of stearic acid used, in other words by varying the ratio of glycerine to higher fatty acids.

In the ordinary uses of the products of my process in the arts it is unnecessary to free them from any uncombined stearic acid and the catalysts used need not be removed. This is because the mono and diglycerides are generally incorporated in very small amounts in edible oils, etc., and the quantity of the catalyst, for example, is so small as to be quite harmless. However, the glycerides can be fractionally distilled from the soap catalyst under reduced pressure or they may be selectively dissolved from the soap. Ether, for example, will dissolve the glyceride but not the soap. Similar common laboratory expedients may be used for removing uncombined stearic acid from the reaction mixture.

It will, of course, be obvious that the process of the present invention is susceptible to many modifications. Thus, for instance, instead of using pure stearic acid I can use lard fatty acids, and I can use mixtures of stearic and palmitic, stearic and lauric and many others. In this way, I can obtain reaction products consisting of mixed mono and diglycerides.

My invention can be used as a method of incorporating mono and diglycerides in fats and oils in situ. This modification is particularly advantageous for margarine manufacture, in the preparation of shortening materials and the like.

For example, many edible oils contain quantities of free higher fatty acids. In such cases I simply add to such an oil or fat sufficient glycerine to convert the free fatty acid to a mono or diglyceride and also add a very small amount, of the order of 1% based on the glycerine, of an alkali-metal glycerate or a soap as a catalyst. The resulting mixture can then be heated to reaction temperature, of the order of 200° C., to cause the glycerine to esterify with the free fatty acids.

In another modification I can add higher fatty acid, glycerine, and catalyst to an edible oil or fat and heat the mixture to reaction temperature.

Both of these modifications just described give me finished oils or fats containing mono or diglycerides as desired, but generally I do not use them in my process because of the necessity for heating up a relatively large volume of fat or oil. The heating costs are inclined to be excessive. The process is of advantage, however, when it is desired to incorporate these glycerides in hydrogenated oils because the fatty acid, glycerine and catalyst can be added to the hot oil flowing from the hydrogenator, thus conserving the heat in the oil and putting it to good use. However, in those cases where it is rather difficult and expensive to free a fat or oil of higher fatty acids in the purification of the oil there are marked advantages in esterifying this higher fatty acid with glycerine in the presence of my catalysts.

Although I have specifically referred in the above examples to the use of soaps and glycerates of the alkali metals it will, of course, be understood that the alkaline earth metal compounds can also be used and accordingly in the appended claims I means the term glycerate or soap of an alkali-forming metal to generically designate both the alkali and alkaline earth groups. Likewise, "higher fatty acid" denotes those acids of the saturated and unsaturated series having six or more carbon atoms.

In the foregoing examples, I have specifically referred to a heating temperature of about 200-220° C. I do not wish to be limited to this particular temperature range, since the reaction between higher fatty acid and glycerine will proceed at a lower temperature, as low as 100-150° C., but at a considerably lower rate. Likewise, I can use temperatures somewhat in excess of 220° C., but ordinarily I do not find this to be particularly advantageous. At higher temperatures some slight decomposition, especially when using sodium glycerate as a catalyst, may occur. This is because of the tendency for lactic acid to be formed at relatively high temperatures.

Having thus described my invention what I claim is:

1. In the process of preparing fatty esters of the class consisting of mono and diglycerides by partially esterifying glycerine with higher fatty acids, the step which comprises partially esterifying the glycerine with a higher fatty acid at a temperature of about 100° C. to 220° C. in the presence of an alkali-forming metal glycerate as a catalyst.

2. In the process of preparing a monoglyceride, the steps which comprises esterifying glycerine with about the quantity of a higher fatty acid necessary to esterify one of the hydroxyl groups of the glycerine, the esterification being conducted at a temperature of about 100° C. to 220° C. in the presence of an alkali-forming metal glycerate as a catalyst.

3. The process as in claim 2 wherein the catalyst is sodium glycerate.

4. The process as in claim 2 wherein the fatty acid is lard fatty acids.

5. In the process of preparing a diglyceride, the steps which comprises esterifying glycerine with about the quantity of a higher fatty acid necessary to esterify two of the hydroxyl groups of the glycerine, the esterification being conducted at a temperature of about 100° C. to 220° C. in the presence of an alkali-forming metal glycerate as a catalyst.

6. The process as in claim 5 wherein the catalyst is sodium glycerate.

7. The process as in claim 5 wherein the fatty acid is lard fatty acids.

8. The process of preparing monostearin which comprises heating to a temperature of about 200-220° C. a mixture of glycerine, stearic acid and a catalyst comprising an alkali-forming metal glycerate, the stearic acid being in about the quantity necessary to esterify one of the hydroxyl groups of the glycerine.

9. The process as in claim 8 wherein the catalyst is sodium glycerate.

10. The process of preparing distearin which comprises heating to a temperature of about 200-220° C. a mixture of glycerine, stearic acid and a catalyst comprising an alkali-forming metal glycerate, the stearic acid being in about the quantity necessary to esterify two of the hydroxyl groups of the glycerine.

11. The process as in claim 10 wherein the catalyst is sodium glycerate.

12. The process as in claim 1 wherein the catalyst is sodium glycerate.

13. In the process of preparing fatty esters of the class consisting of mono and diglycerides by partially esterifying glycerine with higher fatty acids, the step which comprises heating a mixture containing glycerine, higher fatty acid, and a catalyst comprising an alkali-forming metal glycerate, at a temperature of about 100° C. to 220° C., the ratio of glycerine and fatty acid being such that the glycerine is but partially esterified to form the said fatty esters.

CARL W. CHRISTENSEN.